United States Patent
Gorobets et al.

(10) Patent No.: US 9,218,283 B2
(45) Date of Patent: Dec. 22, 2015

(54) MULTI-DIE WRITE MANAGEMENT

(71) Applicant: SanDisk Technologies, Inc., Plano, TX (US)

(72) Inventors: Sergey Gorobets, Edinburgh (GB); Alan Bennett, Edinburgh (GB)

(73) Assignee: SanDisk Technologies Inc., Plano, TX (US)

( * ) Notice: Subject to any disclaimer, the term of this patent is extended or adjusted under 35 U.S.C. 154(b) by 66 days.

(21) Appl. No.: 14/094,550

(22) Filed: Dec. 2, 2013

(65) Prior Publication Data

US 2015/0154108 A1 Jun. 4, 2015

(51) Int. Cl.
*G06F 12/00* (2006.01)
*G06F 12/02* (2006.01)
*G06F 3/06* (2006.01)
*G06F 11/10* (2006.01)

(52) U.S. Cl.
CPC .......... *G06F 12/0246* (2013.01); *G06F 3/0659* (2013.01); *G06F 11/10* (2013.01); *G06F 12/02* (2013.01); *G06F 2212/7201* (2013.01); *G06F 2212/7208* (2013.01)

(58) Field of Classification Search
CPC .................................. G06F 12/02; G06F 11/10
See application file for complete search history.

(56) References Cited

U.S. PATENT DOCUMENTS

| | | |
|---|---|---|
| 5,570,315 A | 10/1996 | Tanaka et al. |
| 5,768,192 A | 6/1998 | Eitan |
| 5,774,397 A | 6/1998 | Endoh et al. |
| 5,887,145 A | 3/1999 | Harari et al. |
| 6,011,725 A | 1/2000 | Eitan |
| 6,046,935 A | 4/2000 | Takeuchi et al. |
| 7,951,669 B2 | 5/2011 | Harari et al. |
| 2001/0007533 A1 | 7/2001 | Kobayashi et al. |
| 2008/0147968 A1 | 6/2008 | Lee et al. |
| 2009/0204872 A1 | 8/2009 | Yu et al. |
| 2011/0072195 A1 | 3/2011 | Lin |
| 2011/0202690 A1* | 8/2011 | Chu et al. .................. 710/14 |
| 2012/0220088 A1 | 8/2012 | Alsmeier |
| 2013/0013852 A1 | 1/2013 | Hou et al. |
| 2013/0073822 A1 | 3/2013 | Sandel et al. |
| 2013/0107628 A1 | 5/2013 | Dong et al. |

OTHER PUBLICATIONS

Eitan et al., "NROM: A Novel Localized Trapping, 2-Bit Nonvolatile Memory Cell," IEEE Electron Device Letters, vol. 21, No. 11, Nov. 2000, pp. 543-545.
Notification of Transmittal of the International Search Report and the Written Opinion of the International Searching Authority, or the Declaration for Int'l Application No. PCT/US2014/64518 mailed Jan. 29, 2015, 11 pages.

* cited by examiner

*Primary Examiner* — Zachary K Huson
(74) *Attorney, Agent, or Firm* — Davis Wright Tremaine LLP

(57) ABSTRACT

A die assignment scheme assigns data in the order it is received, to multiple memory dies. Any busy dies are skipped until they become ready again so that the system does not wait for busy dies to become ready. Immediately sequential writes to the same die are prohibited so that reading speed is not impacted.

22 Claims, 10 Drawing Sheets

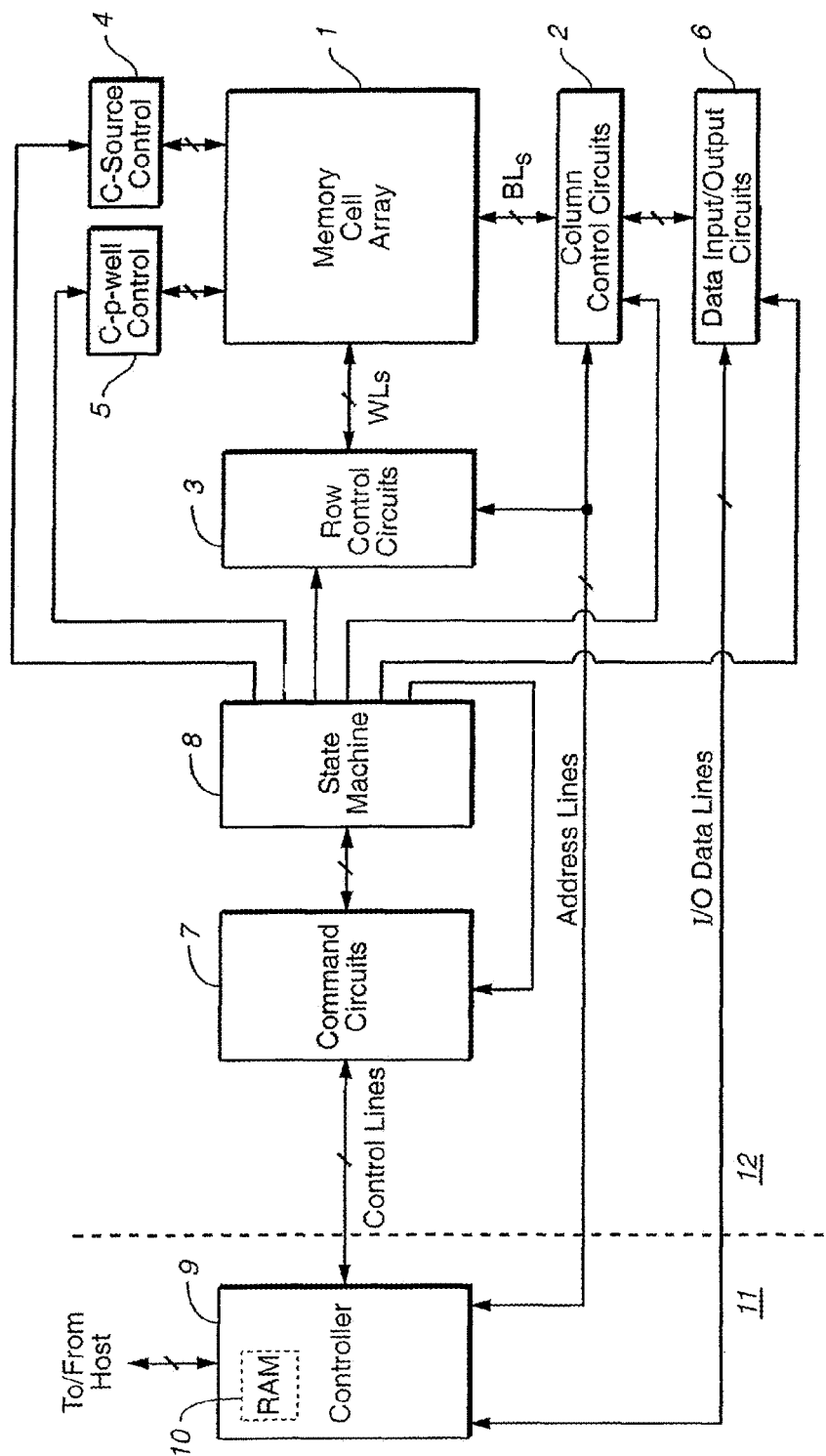
FIG._1
*(Prior Art)*

(Section A-A)

MULTI-DIE WRITE MANAGEMENT

BACKGROUND OF THE INVENTION

This invention relates generally to non-volatile semiconductor memories, their operation and, in particular, to the operation of memory systems that include multiple dies connected by a memory bus.

There are many commercially successful non-volatile memory products available today, which use an array of flash EEPROM cells. An example of a flash memory system is shown in FIG. 1, in which a memory cell array 1 is formed on a memory chip 12, along with various peripheral circuits such as column control circuits 2, row control circuits 3, data input/output circuits 6, etc.

One popular flash EEPROM architecture utilizes a NAND array, wherein a large number of strings of memory cells are connected through one or more select transistors between individual bit lines and a reference potential. FIGS. 2A-2B illustrate an example of a planar NAND flash memory array. In other examples, NAND strings extend in a vertical direction in what may be referred to as three dimensional (3D) memory.

Flash memory is generally arranged in blocks, with a block being the unit of erase. FIG. 3A illustrates blocks in a memory die that are arranged in two planes. Blocks in a plane share certain circuits so that only one block in a plane is accessed at a time. Multiple planes allow multiple blocks in a die to be accessed in parallel.

Multiple dies may be connected to a memory controller by a memory bus as shown in FIG. 3B. The memory controller receives data and distributes it to the dies. While such an arrangement may allow a high degree of parallelism in some conditions, delays may occur when one or more dies become busy and thus may affect write speed.

SUMMARY OF THE INVENTION

A die assignment scheme that is implemented by a memory controller assigns data, in the order it is received, to multiple memory dies that are connected to the memory controller (e.g. by a shared memory bus). Any dies that are busy (e.g. because of controller access) are skipped until they become ready again so that the system does not generally wait for busy dies to become ready. Immediately sequential writes to the same die are prohibited so that parallelism is generally maintained during subsequent read operations, thus allowing relatively high reading speeds.

An example of a method of operating a plurality of nonvolatile memory dies that share a memory bus in a nonvolatile memory system includes: receiving data from a host in a predetermined order; sending the data over the shared memory bus in the predetermined order to the plurality of memory dies according to die number in a cyclic pattern when memory dies are not busy; and sending the data over the shared memory bus in the predetermined order to the next ready memory die in the cyclic pattern, skipping busy dies whenever one or more of the memory dies is busy.

If the next ready memory die in the cyclic pattern was last addressed within x writes, then selecting another memory die may be selected. The value of x may be 1 so that immediately sequential writes to the same die are prohibited. The value of x may be 2 so that writes to the same die must be separated by at least one intervening write to another die. The selection of another memory die may be based on prediction of which memory die is likely to be ready next. The plurality of nonvolatile memory dies may consist of four nonvolatile memory dies. The four nonvolatile memory dies may be NAND flash memory dies. Each of the four nonvolatile memory dies may have at least two planes of memory blocks. If all dies are busy, then the next die that is likely to be ready, excluding the last accessed die, may be selected. The next die that is likely to be ready may be determined by comparing elapsed times since initiation of current write operations in the plurality of memory dies. Data may be transferred to the next die that is likely to be ready and the data may be buffered in the next die that is likely to be ready prior to the next die becoming ready.

An example of a method of operating a nonvolatile memory system with a high degree of parallel write operation includes: receiving units of data from a host in a memory controller; sending the units of data from the memory controller, over a memory bus that connects the memory controller to four memory dies, in a cyclic addressing pattern, until a memory die that is next in the cyclic addressing pattern to a last addressed memory die is busy; and in response to determining that the memory die that is next in the cyclic addressing pattern to the last addressed memory die is busy, skipping the memory die that is next in the cyclic addressing pattern and addressing a subsequent memory die in the cyclic addressing pattern that is ready.

If the subsequent memory die in the cyclic addressing pattern that is ready is the last addressed memory die, then another memory die that is likely to become ready soon may be selected. If the four memory dies are all busy, then a determination may be made as to where subsequent units of data are to be sent based on order in which individual dies are expected to become available. The four memory dies may be NAND flash memory dies.

An example of a nonvolatile memory system includes: a plurality of nonvolatile memory dies; a memory controller; and a data assignment circuit in the memory controller that is configured to assign units of data for storage in the plurality of memory dies by selecting the next ready die of the plurality of nonvolatile memory dies according to a cyclic pattern, skipping busy dies, and prohibiting any immediately sequential writes to any individual die.

The nonvolatile memory system may include a memory bus that connects the plurality of nonvolatile memory dies to the memory controller. Additional memory busses may connect additional pluralities of nonvolatile memory dies to the memory controller, each additional plurality of nonvolatile memory dies having data assigned by the data assignment circuit by selecting the next ready die of the additional plurality of nonvolatile memory dies according to the cyclic pattern, skipping busy dies, and prohibiting any immediately sequential writes to any individual die. The data assignment circuit may be further configured so that, if none of the plurality of nonvolatile memory dies is ready, units of data are assigned in order in which nonvolatile memory dies are likely to become ready. The nonvolatile memory dies may be NAND flash memory dies. The nonvolatile memory dies may be three-dimensional NAND flash memory dies with multiple layers of memory cells. A host interface may be configured to couple the nonvolatile memory system to different hosts at different times through a set of electrical contacts. A prediction circuit may predict which of the plurality of nonvolatile memory dies is likely to be ready next. The prediction circuit may include a timing circuit that measures elapsed time since initiation of a write in a memory die and estimates remaining time for the write in the die.

Additional aspects, advantages and features of the present invention are included in the following description of examples thereof, which description should be taken in conjunction with the accompanying drawings. All patents, patent applications, articles, technical papers and other publications referenced herein are hereby incorporated herein in their entirety by this reference.

BRIEF DESCRIPTION OF THE DRAWINGS

FIG. 1 is a block diagram of a prior art memory system.

DETAILED DESCRIPTION OF EXEMPLARY EMBODIMENTS

Memory System

Figure 2A:
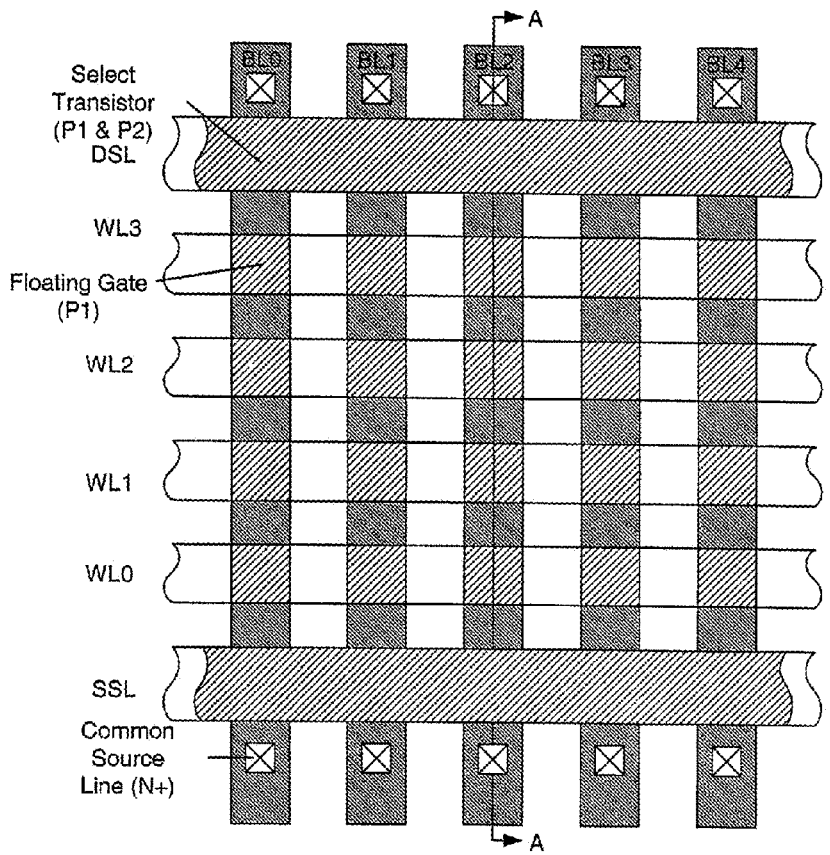
FIG. 2A is a plan view of a prior art NAND array.

An example of a prior art memory system, which may be modified to include various aspects of the present invention, is illustrated by the block diagram of FIG. 1. A memory cell array 1 including a plurality of memory cells M arranged in a matrix is controlled by a column control circuit 2, a row control circuit 3, a c-source control circuit 4 and a c-p-well control circuit 5. The memory cell array 1 is, in this example, of the NAND type similar to that described above in the Background and in references incorporated therein by reference. A control circuit 2 is connected to bit lines (BL) of the memory cell array 1 for reading data stored in the memory cells (M), for determining a state of the memory cells (M) during a program operation, and for controlling potential levels of the bit lines (BL) to promote the programming or to inhibit the programming. The row control circuit 3 is connected to word lines (WL) to select one of the word lines (WL), to apply read voltages, to apply program voltages combined with the bit line potential levels controlled by the column control circuit 2, and to apply an erase voltage coupled with a voltage of a p-type region on which the memory cells (M) are formed. The c-source control circuit 4 controls a common source line (labeled as "c-source" in FIG. 1) connected to the memory cells (M). The c-p-well control circuit 5 controls the c-p-well voltage.

The data stored in the memory cells (M) are read out by the column control circuit 2 and are output to external I/O lines via an I/O line and a data input/output buffer 6. Program data to be stored in the memory cells are input to the data input/output buffer 6 via the external I/O lines, and transferred to the column control circuit 2. The external I/O lines are connected to a controller 9. The controller 9 includes various types of registers and other memory including a volatile random-access-memory (RAM) 10.

The memory system of FIG. 1 may be embedded as part of the host system, or may be included in a memory card, USB drive, or similar unit that is removably insertible into a mating socket of a host system. Such a card may include the entire memory system, or the controller and memory array, with associated peripheral circuits, may be provided in separate cards. Several card implementations are described, for example, in U.S. Pat. No. 5,887,145. The memory system of FIG. 1 may also be used in a Solid State Drive (SSD) or similar unit that provides mass data storage in a tablet, laptop computer, or similar device.

Figure 2B:
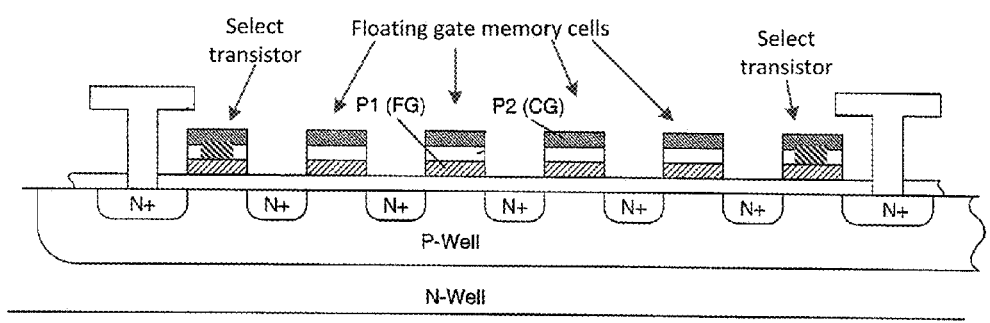
FIG. 2B is a cross-sectional view of the prior art NAND array of FIG. 2A taken along the line A-A.

A portion of a memory array that may be used as array 1 is shown in FIG. 2A. BL0-BL4 represent diffused bit line connections to global vertical metal bit lines (not shown). Although four floating gate memory cells are shown in each string, the individual strings typically include 16, 32 or more memory cell charge storage elements, such as floating gates, in a column. Control gate (word) lines labeled WL0-WL3 and string selection lines DSL and SSL extend across multiple strings over rows of floating gates. Control gate lines and string select lines are formed of polysilicon (polysilicon layer 2, or "poly 2," labeled P2 in FIG. 2B, a cross-section along line A-A of FIG. 2A). Floating gates are also formed of polysilicon (polysilicon layer 1, or "poly 1," labeled P1). The control gate lines are typically formed over the floating gates as a self-aligned stack, and are capacitively coupled with each other through an intermediate dielectric layer 19 (also referred to as "inter-poly dielectric" or "IPD") as shown in FIG. 2B. This capacitive coupling between the floating gate and the control gate allows the voltage of the floating gate to be raised by increasing the voltage on the control gate coupled thereto. An individual cell within a column is read and verified during programming by causing the remaining cells in the string to be turned on hard by placing a relatively high voltage on their respective word lines and by placing a relatively lower voltage on the one selected word line so that the current flowing through each string is primarily dependent only upon the level of charge stored in the addressed cell below the selected word line. That current typically is sensed for a large number of strings in parallel, thereby to read charge level states along a row of floating gates in parallel. Examples of NAND memory cell array architectures and their operation are found in U.S. Pat. Nos. 5,570,315, 5,774,397, 6,046,935, and 7,951,669.

Nonvolatile memory devices are also manufactured from memory cells with a dielectric layer for storing charge. Instead of the conductive floating gate elements described earlier, a dielectric layer is used. Such memory devices utilizing dielectric storage element have been described by Eitan et al., "NROM: A Novel Localized Trapping, 2-Bit Nonvolatile Memory Cell," IEEE Electron Device Letters, vol. 21, no. 11, November 2000, pp. 543-545. An ONO dielectric layer extends across the channel between source and drain diffusions. The charge for one data bit is localized in the dielectric layer adjacent to the drain, and the charge for the other data bit is localized in the dielectric layer adjacent to the source. For example, U.S. Pat. Nos. 5,768,192 and 6,011,725 disclose a nonvolatile memory cell having a trapping dielectric sandwiched between two silicon dioxide layers. Multi-state data storage is implemented by separately reading the binary states of the spatially separated charge storage regions within the dielectric.

In addition to planar (two dimensional) memory arrays as described above, three dimensional memory arrays are formed with multiple layers of memory cells stacked above each other on a substrate. Examples of such three dimensional memory arrays, their formation, and their operation are described in U.S. Patent Publication Number 2012/0220088 and in U.S. Patent Publication Number 2013/0107628, which are hereby incorporated by reference in their entirety.

In many nonvolatile memory arrays (including both planar and 3-D memories), memory cells are erased in relatively large units that are referred to as blocks. Blocks may be arranged in planes, with all blocks of a plane sharing a set of bit lines and sharing certain memory access circuits such as sense amplifiers and data latches that are used to program and read memory cells in the plane. Two or more planes may be located on the same die.

Figure 3A:
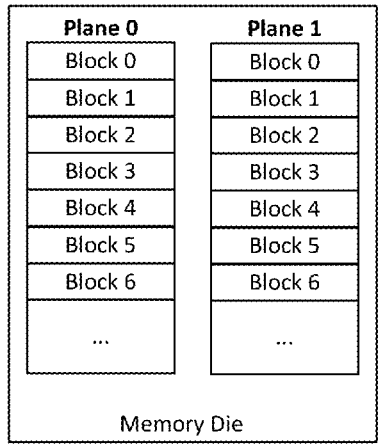
FIG. 3A shows blocks of memory cells arranged in two planes of a memory die.
Figure 3B:
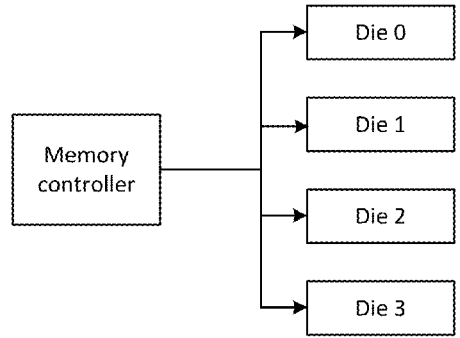
FIG. 3B shows four dies that are connected by a memory bus to a memory controller.

FIG. 3A shows an example of a die that has two planes, Plane 0 and Plane 1, each containing multiple blocks. FIG. 3B shows how memory dies may be configured within a multi-die memory system. FIG. 3B shows a memory controller in communication with multiple memory dies over a memory bus. In general, such a multi-die arrangement may be used to write and read data rapidly by operating dies in parallel. Data that is received from a host may be sent by the memory controller to the memory dies which initially store the data in data latches and then program the data into memory cells. While the memory bus may only allow data to be sent to one die at a time, data transfer time is relatively short compared with the time to program the data to memory cells of the die so that while data is being sent to one die other dies may be programming data. In some cases, a memory controller may control multiple memory busses, each with multiple memory dies (e.g. two busses with two dies each). In other cases, memory dies may have dedicated communication channels instead of a shared memory bus (e.g. four dies, each with separate communication channel to controller). The number of dies in any of these arrangements is not limited to four but may be any suitable number.

Figure 4:
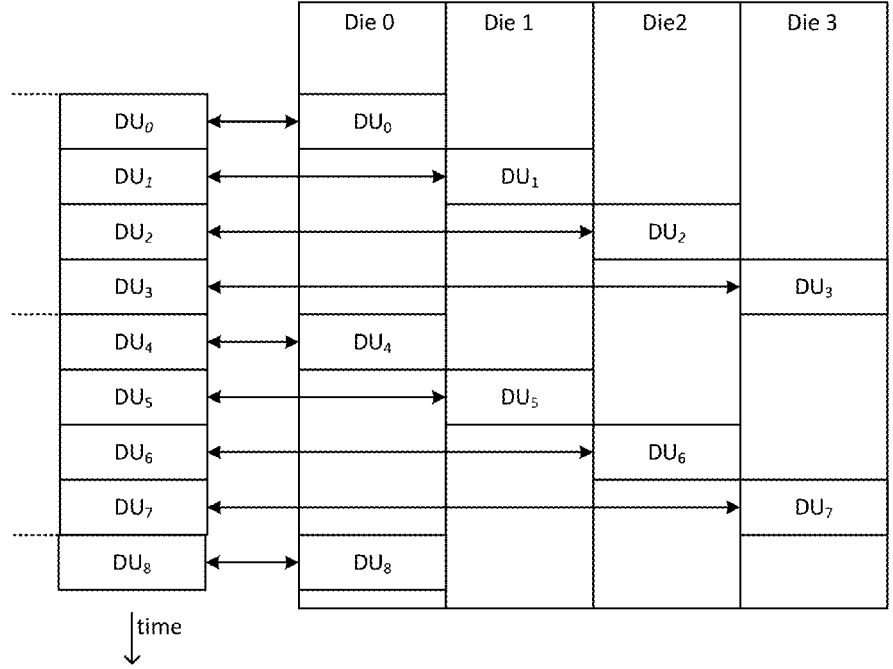
FIG. 4 shows assignment of host data to four dies according to a predetermined pattern.

FIG. 4 shows an example of a scheme for assigning data to memory dies. Data that is received from a host may be divided into data units ("DU") for transfer to the memory dies (die 0-die 3). In the present example, data received from the host is simply divided into equal sized data units in the order it was received, with each data unit being equal in size to the amount of data that can be programmed in a die in one programming operation (one page where the die includes one plane, two pages where the die includes two pages, etc.). Data units are numbered in order in which they are received $DU_0$, $DU_1$, $DU_2$, and so on. It will be understood that the numbering reflects the order in which the data was received and does not necessarily reflect any order assigned by the host. Data that is received from the host may be logically sequential or nonsequential. In either case it may be divided into data units in the order in which it was received and assigned to dies as shown. Data is striped across all dies so that writing is performed with high parallelism. FIG. 4 shows time along the vertical axis with $DU_0$ being received and stored first, then $DU_1$, and so on.

Data units are assigned to dies in a cyclic order in FIG. 4. The cyclic order starts with die 0, then die 1, die 2, die 3, and then back to die 0 where the cycle repeats. This assignment scheme is simple to implement. In some cases, blocks of different dies are linked to form metablocks so that a group of data units are assigned to a metapage within a metablock Linking of blocks to form metablocks may be static so that the same blocks remain linked throughout the lifecycle of the product, or may be a more flexible dynamic linking, with different blocks linked at different times. In either case, the same blocks remain linked between successive erase operations and pages within the blocks are programmed together as a metapage. Thus, where the example of FIG. 4 uses metablocks, a group of four data units would be assigned to a metapage that extends across all four dies and the assignment of individual data units to dies would be predetermined (e.g. striped as shown). The location at which each data unit is stored is a simple function of its number so that such a scheme is easy to implement. The scheme also provides maximum parallelism by always writing across all dies. This not only ensures maximum parallelism when writing, it also ensures maximum parallelism when the data is later read. However, this scheme is not ideal for all situations.

In many memory systems, the memory array is not just used to store host data. The memory controller may store other data in the memory array. For example, certain data that is used by the memory controller for operation of the memory system may be stored in one or more dies. Such system control data may include information used to keep track of the location and the nature of host data that is stored by the controller, for example, File Allocation Table (FAT) data, directory data, and logical-to-physical address translation data. Data regarding characteristics of the memory system may also be stored by the controller, e.g. bad block lists, memory access parameters, and hot counts. The type of controller data stored in memory dies depends on the particular memory system. The controller may need to access a memory die to read or write such data at any time, for example, during a host write. Furthermore, a memory controller may perform various operations that involve host data that is stored in a memory die. For example, garbage collection operations may include copying valid data from some blocks so that the blocks can be erased and made available for new data. Particularly when the memory is relatively full, it may be necessary to perform garbage collection operations during host writes in order to accommodate the new data being received. Controller access operations, whether they are directed to system control data or host data, may have an impact on writing host data.

Figure 5:
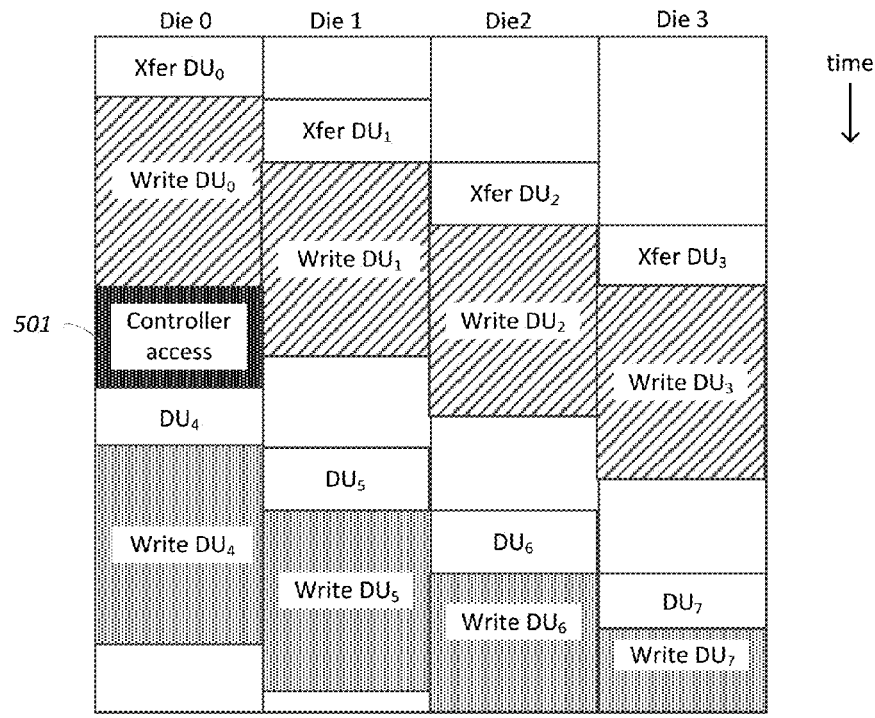
FIG. 5 shows an example of timing of write operations across four dies using deterministic assignment of data to dies.

FIG. 5 shows an example in which data units are transferred and written in a deterministic pattern as described above. $DU_0$ is first transferred ("Xfer $Du_0$") and then written ("Write $DU_0$"). During transfer of any data, such as $Du_o$, the memory bus is busy. Once the transfer is complete and writing begins, the memory bus is available for a subsequent transfer. Thus, transfer of $DU_1$ ("Xfer $DU_1$") begins as soon as transfer of $Du_0$ ends. Similarly, transfer of subsequent data units begins after the prior transfer ends so that write operations may occur in multiple dies in parallel. For a period of time all dies are busy. Then, die 0 completes writing $DU_0$. However, a controller access to die 0, 501, occurs at this time. The controller may need to write data for example. In other examples, a controller may copy data, perform a scan, a control table read, or update, or some other operation that requires access to a memory die. Thus, die 0 remains busy and unavailable for storage of host data. Because the next die in the cyclic pattern, die 0, is busy, programming of host data is delayed until it becomes available at the end of the controller access. Subsequently, transfer and writing of data recommences as before, with the same assignment of data to dies, just delayed by the time taken for the controller access 501.

According to an aspect of the present invention, data received from a host is assigned to memory dies in a manner that is not simply deterministic, but instead assigns data on the basis of die availability. When the next die in cyclic order is busy, the assignment scheme adapts by skipping the busy die and proceeds to the next die. Thus, time lost because of controller access may be significantly reduced because while the controller is accessing a given die, host data continues to be transferred to, and written in, other dies.

Figure 6:
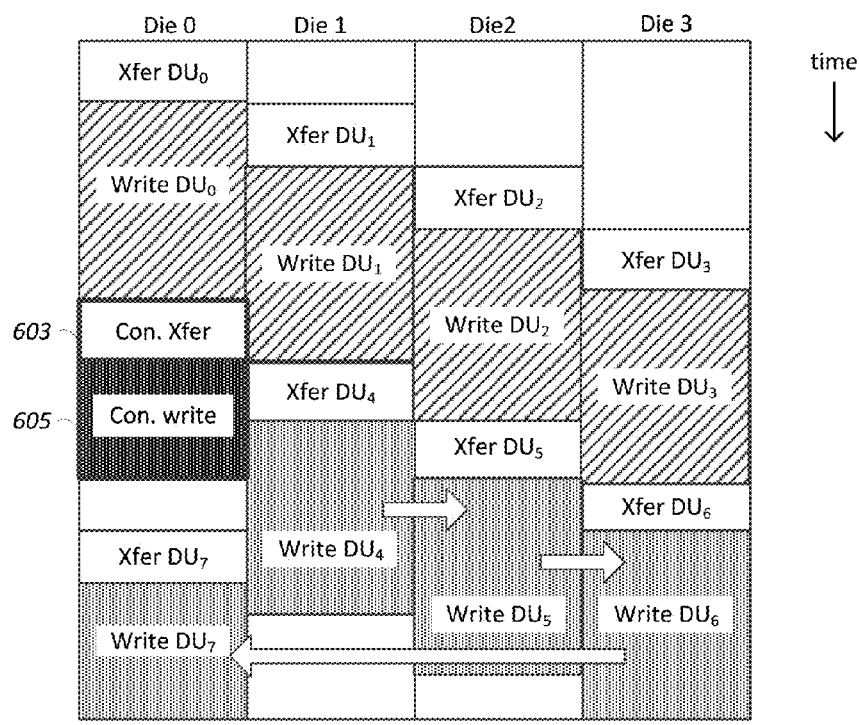
FIG. 6 shows another example of timing of write operations across four dies using adaptive assignment of data to dies.

FIG. 6 shows an example of an adaptive assignment scheme in which any busy die is skipped. $DU_0$-$DU_3$ proceed in cyclic order as before. Die 0 is then busy because the controller stores data in die 0. This access operation is shown as transfer of data from the controller to die 0 ("Con. Xfer") 603, which occupies the memory bus, followed by writing of controller data ("Con. Write") 605, which does not occupy the memory bus. In general, transfer time is much less than write time for any given data (while the vertical axis represents time in FIG. 6, operations are not intended to be to scale, i.e. vertical dimensions of boxes are not intended to represent actual times for operations). Once the controller data is transferred and the memory bus becomes available, the scheme moves to the next die in the cyclic order that is not busy. In this case, die 1 is not busy when transfer of controller data 603 ends. Therefore, the scheme assigns the next data, $DU_4$, to die 1. Subsequently, the assignment scheme proceeds in cyclic order as indicated by the arrows so that $DU_7$ is written in die 0 (because the order is cyclic, it wraps around from die 3 to die 0). Thus, in this example, assignment of data units to dies is shifted by one die. The effect of controller access is significantly reduced so that the delay is simply the time that the controller occupies the memory bus (Con. Xfer) 603, which is relatively short, and does not include the time for the controller write 605 (as in FIG. 5), which is much longer.

Figure 7:
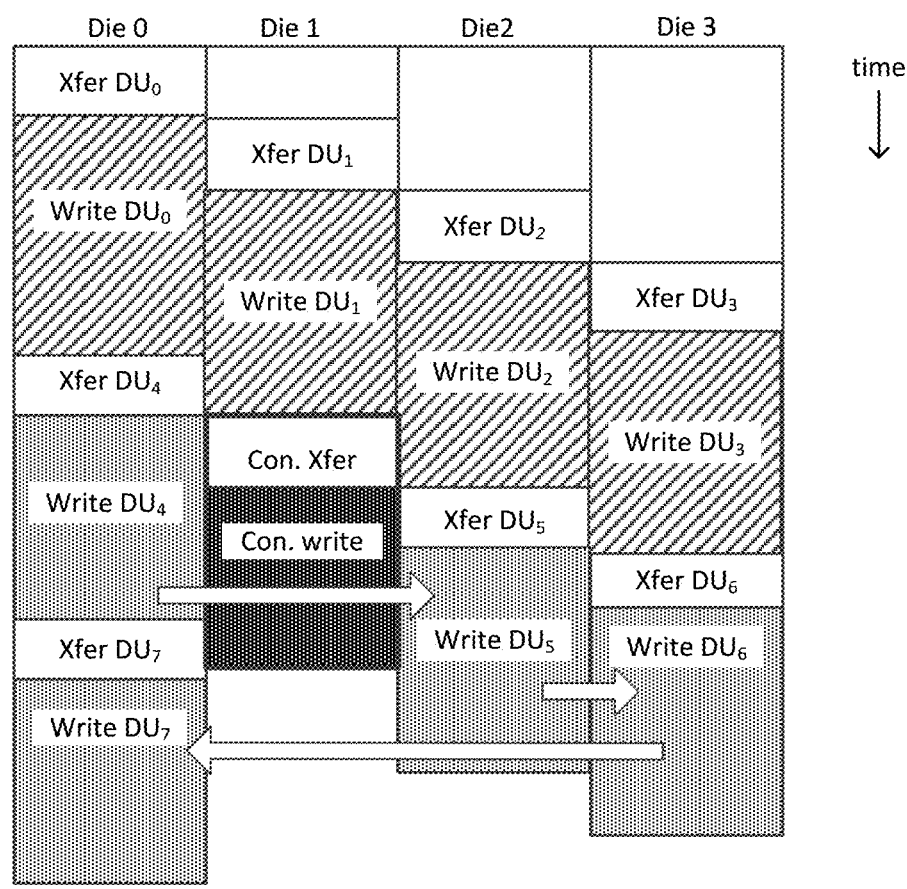
FIG. 7 shows another example of timing of write operations across four dies using adaptive assignment of data to dies.

While the example of FIG. 6 shows skipping the first die in a cyclic pattern, any die, or any group of dies, may be skipped in this manner. FIG. 7 shows an example in which $DU_4$ is transferred to die 0 and then a controller data transfer occurs to die 1 which occupies the memory bus and die 1. Subsequently, when the controller transfer ends and the memory bus is available, the scheme skips die 1, which remains busy with the controller write, and proceeds to the next ready die, die 2, Subsequently, the scheme proceeds in cyclic order to die 3 and then die 0. It can be seen that in this example, in a group of four sequential data units, there are two writes to die 0 and no writes to die 1. In some examples, an order of programming like this, in which programming returns to a particular die without programming all other dies is allowed while in other cases it may be prohibited.

Figure 8:
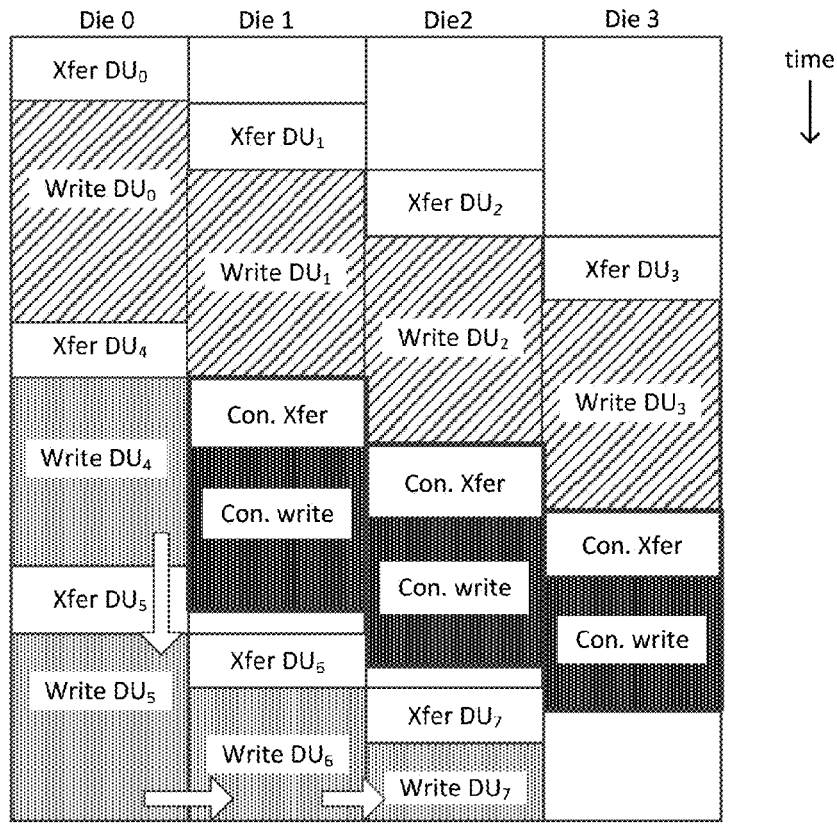
FIG. 8 shows an example of timing of write operations that includes immediately sequential writes to the same die.

FIG. 8 shows another example in which four successive data units are unevenly distributed over four dies. In this case, $DU_4$ is written to die 0. Then, controller writes to die 1, die 2, and die 3 occur so that the memory bus remains busy for some time, and when the memory bus becomes available, die 1, die 2, and die 3 remain busy with controller writes. Therefore, the next ready memory die is die 0. So in this case, $DU_4$ and $DU_5$ are both written to die 0. Then, $DU_6$ and $DU_7$ are written to dies 1 and 2 respectively. While this sequence may provide relatively good write speed under the circumstances, having two immediately sequential writes to the same die may result in data being stored in a way that reduces read speed. In particular, data may be read in the same order in which it was written. For example, if $DU_4$-$DU_5$ were sent as part of a single write command, it is likely that they will be read together in response to a read command. However, reading of $DU_4$ and $DU_5$ must be performed in series which may be relatively slow. Therefore, according to an example, writing twice in succession to the same die is prohibited. Comparing the example of FIG. 8 with the example of FIG. 7, it can be seen that in FIG. 7 two data units $DU_4$ and $DU_7$ within a group of four sequential data units were written to the same die. However, the two data units were not immediately sequential. Instead, they were separated by two other data units $DU_5$ and $DU_6$. Thus, when data is read, $DU_5$ and $DU_6$ can be read in parallel with $DU_4$, and reading of DU7 can start immediately after reading DU4, in parallel with transfer of DU4, DU5, and DU6. If the transfer time for these three DUs is greater than reading time for DU4 then DU4 may be transferred immediately after it is read. Thus, storing two DUs in the same die does not cause any delay compared with storing each DU in a different die in this case. In contrast, reading data that is stored as shown in FIG. 8 would generally require reading $DU_4$ alone first, with minimum parallelism (one-die) and only then reading the next units. An assignment scheme may follow a cyclic pattern, skipping any busy dies, and prohibiting immediately sequential writes to the same die.

Figure 9:
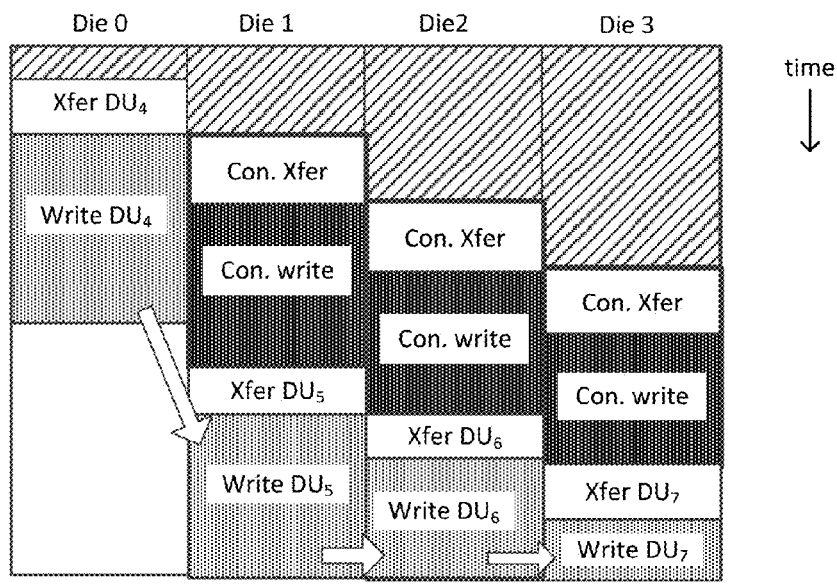
FIG. 9 shows another example of timing of write operations across four dies using a scheme that prohibits immediately sequential writes to the same die.

FIG. 9 shows an example of a scheme that follows a cyclic pattern, skipping busy dies, and prohibiting immediately sequential writes to any die. As in FIG. 8, after $DU_4$ is transferred, controller access operations occupy the memory bus, and then occupy die 1, die 2, and die 3. Subsequently, the first die to become ready is die 0. However, in this scheme immediately sequential writes to the same die are prohibited. Therefore, because die 0 was last written with $DU_4$, it cannot be selected for $DU_5$. The list of candidates for assignment of $DU_5$ is limited to die 1, die 2, and die 3. Therefore, the memory system waits for one of these dies to become available. Subsequently, when die 1 becomes available, $DU_5$ is transferred and written in die 1. The assignment scheme continues to die 2, and die 3.

Figure 10A:
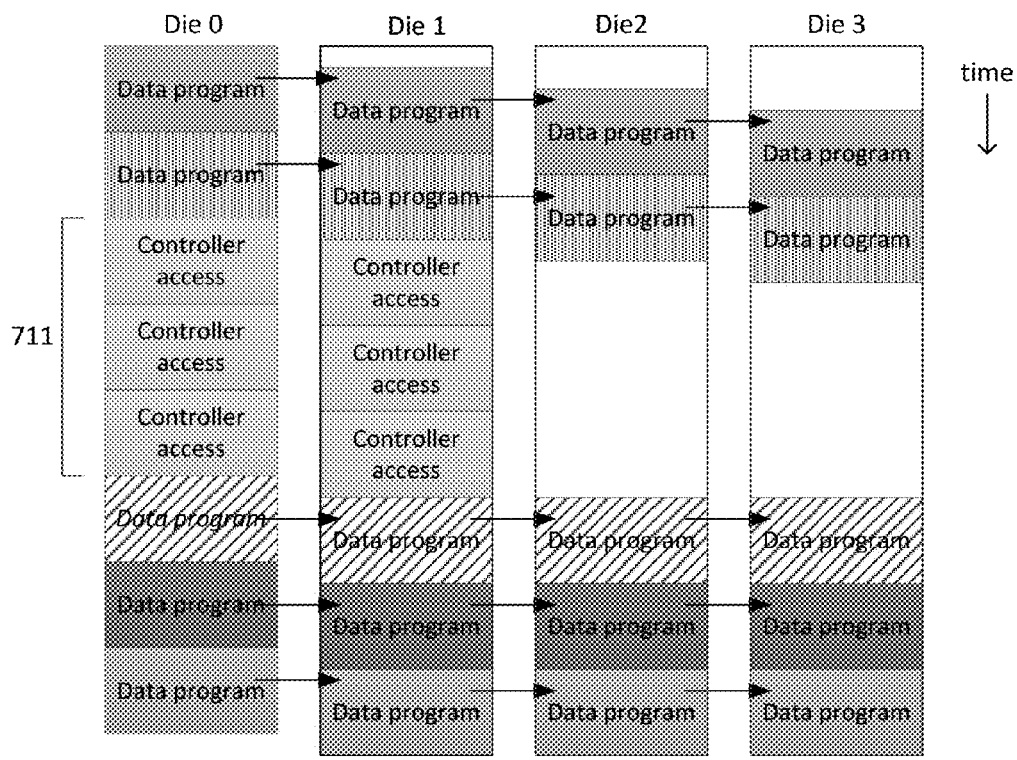
FIGS. 10A-10B illustrate how different assignment schemes apply when two dies remain busy due to controller access.
Figure 10B:
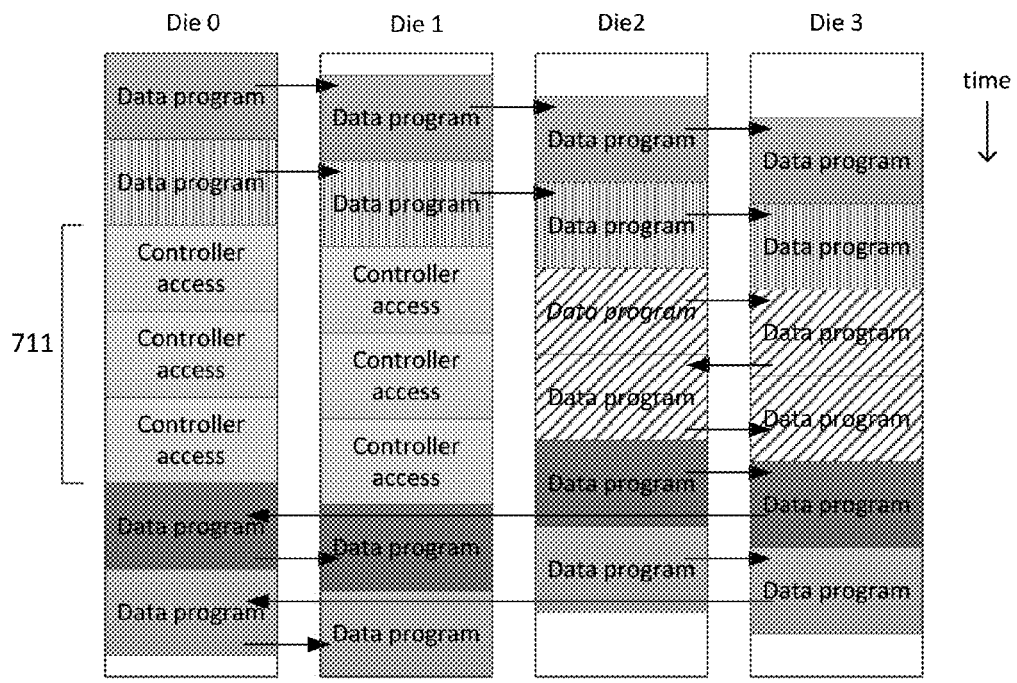

FIGS. 10A and 10B illustrate how assignment schemes may be applied to a case where two of three dies are occupied with controller access operations. FIG. 10A shows a deterministic cyclic assignment scheme in which every fourth data unit is assigned to a particular die. When a series of controller access operations occur in die 0 and die 1, 711, the memory system simply waits for the operations to complete so that host writes can continue to the dies in the cyclic order.

FIG. 10B shows the same controller access operations 711 where an assignment scheme is adaptive to busy dies. In this case the assignment scheme skips busy dies, and may prohibit immediately successive assignment to the same die. Thus, when die 0 and die 1 are busy, the assignment scheme simply assigns data to die 2 and die 3. When the resulting writes are complete and die 0 and die 1 are still busy, the assignment scheme assigns more data to die 2 and die 3. Subsequently, when die 0 and die 1 become available again, the assignment scheme returns to using all dies. Thus, the scheme is adaptive to varying controller usage. While this scheme, which alternates between just two dies for a time, may be acceptable in some cases, in other cases it may be prohibited. In some cases, two writes to the same die within a certain number of writes may be prohibited. Two writes to the same die within two writes (i.e. immediately successive writes to the same die, as shown in FIG. 8) may be prohibited to avoid slower reading speed. Two writes to the same die within three writes may be similarly prohibited. Repeated writes to the same die may be prohibited within a window of any number of writes (up to the number of dies in the scheme). For example, prohibiting repeated writes to the same die within an n-die window, in an n-die scheme, ensures that all n dies are written for any series of n data units, thus ensuring maximum parallelism. Other levels of parallelism may be enforced by a reduced window (e.g. n−1, n−2, etc.). Thus, writes to a die may be prohibited if the die was last addressed within x writes, where x is the size of the window. Setting x=1 prohibits writes only if the immediately prior write was to the same die. Setting x=2 additionally prohibits writes if the die was accessed in the write before that, and so on. In general, requiring some writes of other dies between writes to a particular die means that when data is read there is greater parallelism. While a first portion of data is being read (sensed) in the particular die, the other dies may also be read. Then, while the first portion of data and the data from other dies is being transferred, the second portion of data may be read from the particular die in parallel. The number of other dies accessed between writes to a particular die may be chosen according to the read times and transfer times associated with the particular memory system to ensure that reads are generally performed in parallel with transfers.

Figure 11A:
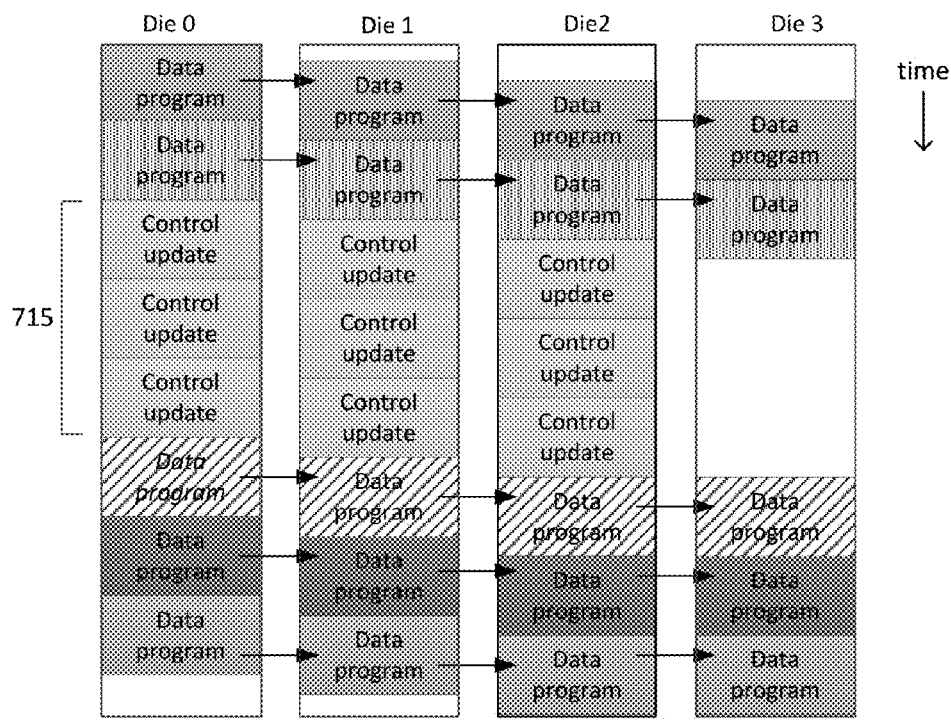
FIGS. 11A-11B illustrate how different assignment schemes apply when three dies remain busy due to controller access.
Figure 11B:
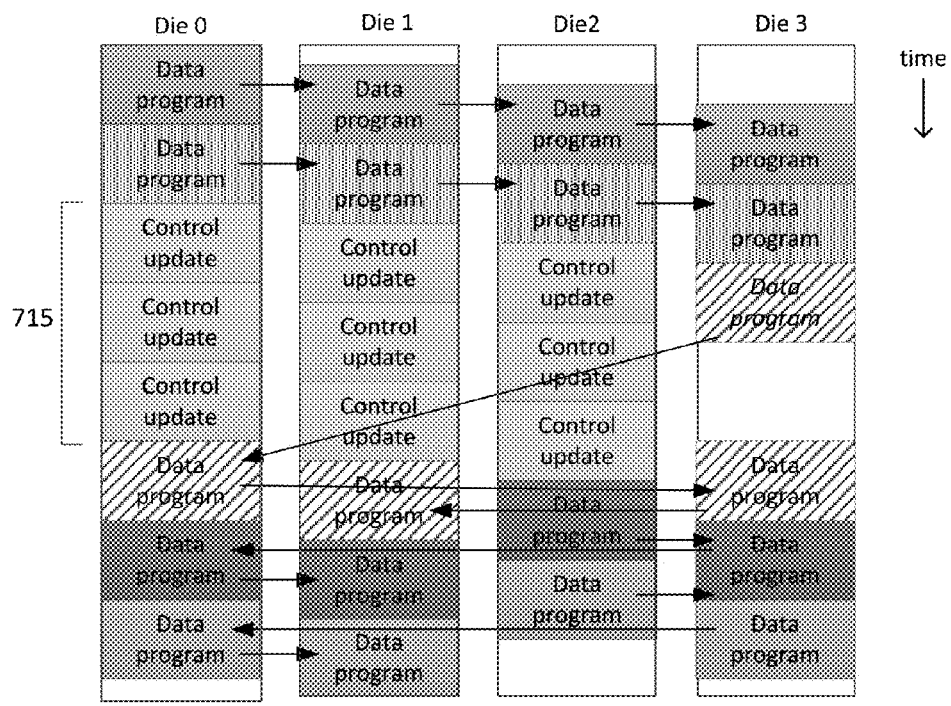

FIGS. 11A and 11B illustrate how assignment schemes may be applied to a case where three of four dies are occupied with controller access operations. FIG. 11A shows a deterministic cyclic assignment scheme. When a series of controller access operations 715 occur in die 0, die 1, and die 2, the memory system simply waits for the operation to complete so that host writes can continue in the cyclic order.

FIG. 11B shows the same controller access operations 715 to die 0, die 1, and die 2, with an assignment scheme that is adaptive to busy dies. In this case the assignment scheme skips busy dies and prohibits immediately successive assignment to the same die. Thus, when die 0, die 1, and die 2 are all busy, the scheme assigns data to die 3. Subsequently, the next available die is die 3 because die 0, die 1, and die 2 continue to be occupied with controller access operations. Because immediately successive assignment to the same die is prohibited, die 3 cannot be written again and the system waits for another die to become ready. Subsequently, data is assigned to die 0, die 3 and die 1 as they become ready.

In some cases, a memory controller may anticipate which die is going to become ready next instead of waiting for the die to actually become ready. Thus, instead of waiting for the memory die to assert a ready signal, the memory controller may estimate how long the die has left to complete a current operation. Thus, for example, in FIG. 11B, while waiting for a die to become available, the memory controller may recognize that the next die that is going to become available is die 0. In some cases, the memory controller may be able to initiate a write operation to such a die even before completion of a prior write operation. For example, in some cases, a memory die may have multiple sets of on-chip data latches so that while one set of data latches is used to hold data being written to the memory array, another set of data latches may be used to buffer the next data to be written. Thus, it is not necessary for the memory controller to actually wait for completion of a write operation in order to assign data to a die and begin transfer of the data in preparation for writing it.

Figure 12:
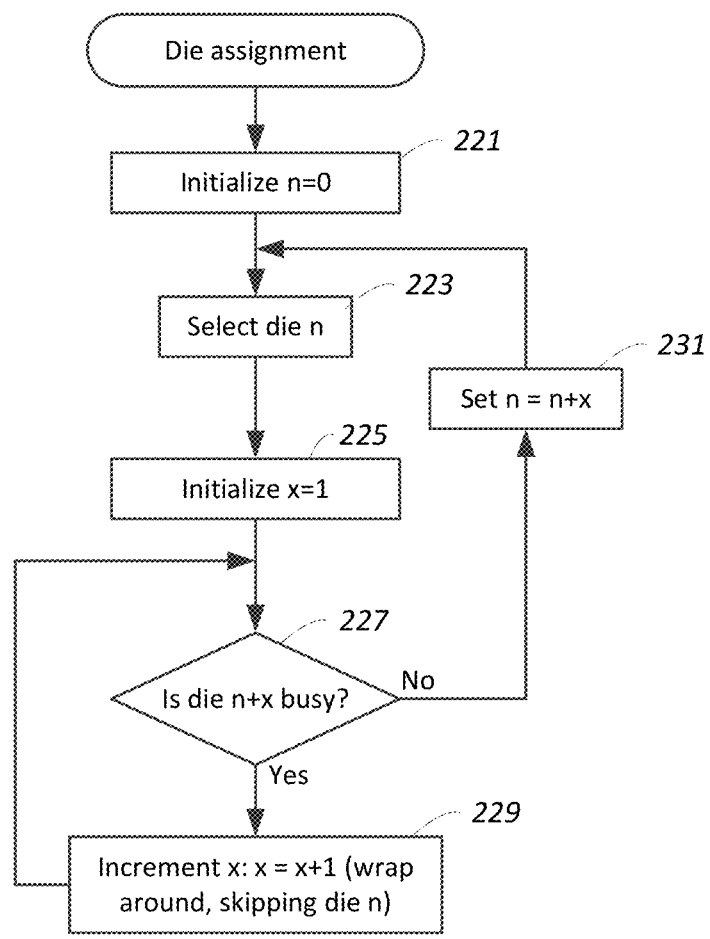
FIG. 12 illustrates an assignment scheme that skips busy dies.

FIG. 12 illustrates a die assignment scheme according to an example. A current die number, "n," is initialized to 0 221. Die n is selected 223. Then the scheme looks for the next die to select. A die number increment x is initialized to one 225. A determination is made as to whether die n+x is busy 227. If it is busy, then die increment x is set to x+1, 229 (e.g. x goes from 1 to 2) and the determination is made for another die 227 (e.g. die n+2). Incrementing may wrap around cyclically, skipping the currently selected die to prevent selecting the same die twice in succession (e.g. if die 0 is selected, x goes 1, 2, 3, 1, 2, 3 . . . ). If die n+x is not busy, then n is reset to n+x, 231 and die n is selected 223 (i.e. updated value of n is used to select the next die).

Figure 13:
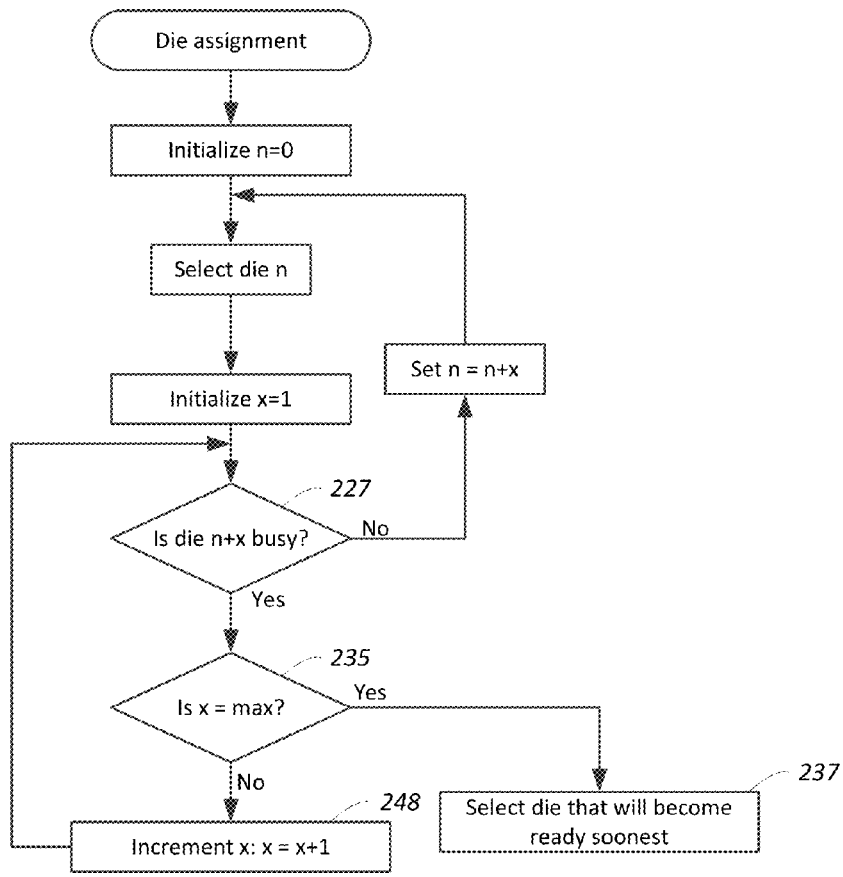
FIG. 13 illustrates an assignment scheme that assigns data to a die that is currently busy based on when it is likely to be ready.

While the example of FIG. 12 shows a scheme that assigns data to dies based on whether dies are busy, it is also possible to take account of when particular dies are likely to become busy. FIG. 13 shows an example of an assignment scheme that is similar to FIG. 12. However, in this case, after it is determined that a die is busy 227, a determination is made as to whether the value of x is at a maximum 235. The maximum may be a value that reflects all dies being busy. For example, if die 0 is the currently selected die, and the value of x is 3, then the assignment has already determined that dies 1-3 are busy. Instead of repeatedly cycling through the dies until one of the dies becomes ready, in this case, once all dies are found to be busy, the scheme selects the die that will become ready soonest 237 (excluding the currently selected die). In this way, the memory controller may prepare for the write operation before the die actually becomes ready. Determining which die will become ready soonest may be based on the start time for the current operation in each die and an estimate of the total time needed for each operation.

Figure 14:
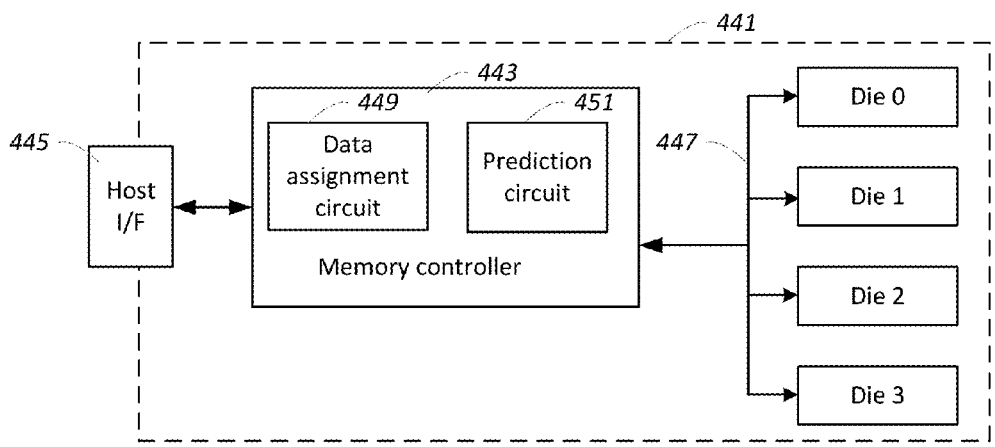
FIG. 14 shows hardware that may be used to implement aspects of the present invention.

FIG. 14 shows an example of hardware that may be used to implement aspects of the present invention. A memory system 441 includes a memory controller 443 that is in communication with a host through a host interface 445. The memory controller 443 is in communication with four memory dies (die 0-die 3) through a memory bus 447. While only one such bus is shown for clarity, it will be understood that a memory controller may have multiple memory busses, each with multiple memory dies. The memory controller 443 includes a data assignment circuit 449 that assigns data to dies in a manner that is adaptive to controller access operations. In particular, the data assignment circuit 449 skips over busy dies to select the next ready die (while prohibiting immediately successive writes to the same die). A prediction circuit 451 includes timers for each die, which are initiated when an operation starts in each die and allows prediction of which die will become ready first.

While aspects of the present invention are illustrated by the above examples, it will be understood that the examples are just that—examples—and are not intended to show every possible embodiment. For example, while the above examples show four dies per memory bus, different numbers of dies may be provided. In some examples, there may be 8, 16, or more dies on a memory bus. Some number of such dies (e.g. 4) may be active at any given time with remaining dies being inactive. Also, while the present illustrations show a cyclic pattern 0, 1, 2, 3, 0, 1 . . . and so on, a cycle may begin with any die (not necessarily die 0) and may proceed in any order from die to die (not necessarily in increasing die number). While a controller write is shown as an example of a controller access operation in man of the above examples, any controller access operation may similarly affect writing of host data.

Conclusion

Although the various aspects of the present invention have been described with respect to exemplary embodiments thereof, it will be understood that the present invention is entitled to protection within the full scope of the appended claims. Furthermore, although the present invention teaches the method for implementation with respect to particular prior art structures, it will be understood that the present invention is entitled to protection when implemented in memory arrays with architectures than those described.

The invention claimed is:

1. A method of operating a plurality of nonvolatile memory dies in a nonvolatile memory system, comprising:
receiving data from a host in a predetermined order;
sending the data in the predetermined order over a memory bus to the plurality of memory dies according to die number in a cyclic pattern when memory dies are not busy, the plurality of memory dies including at least four memory dies that are connected to the memory bus; and
sending the data in the predetermined order to the next ready memory die in the cyclic pattern, skipping busy dies whenever the cyclic pattern selects a memory die that is busy.

2. The method of claim 1 wherein, if the next ready memory die in the cyclic pattern was last addressed within x writes, then selecting another memory die.

3. The method of claim 2 wherein x=1 so that immediately sequential writes to the same die are prohibited.

4. The method of claim 2 wherein x=2 so that writes to the same die must be separated by at least two intervening writes to another die.

5. The method of claim 2 wherein selection of another memory die is based on prediction of which memory die is likely to be ready next.

6. The method of claim 1 wherein the four nonvolatile memory dies are NAND flash memory dies.

7. The method of claim 6 wherein each of the four nonvolatile memory dies has at least two planes of memory blocks.

8. The method of claim 1 wherein, if all dies are busy, then selecting the next die that is likely to be ready, excluding the last accessed die.

9. The method of claim 8 wherein the next die that is likely to be ready is determined by comparing elapsed times since initiation of current write operations in the plurality of memory dies.

10. The method of claim 8 further comprising transferring data to the next die that is likely to be ready and buffering the data in the next die that is likely to be ready prior to the next die becoming ready.

11. A method of operating a nonvolatile memory system with a high degree of parallel write operation, comprising:
receiving units of data from a host in a memory controller;
sending the units of data from the memory controller, over a memory bus that connects the memory controller to four memory dies, in a cyclic addressing pattern, until a memory die that is next in the cyclic addressing pattern to a last addressed memory die is busy; and
in response to determining that the memory die that is next in the cyclic addressing pattern to the last addressed memory die is busy, skipping the memory die that is next in the cyclic addressing pattern and addressing a subsequent memory die in the cyclic addressing pattern that is ready.

12. The method of claim 11 wherein, if the subsequent memory die in the cyclic addressing pattern that is ready is the last addressed memory die, then selecting another memory die that is likely to become ready soon.

13. The method of claim 11 further comprising, if the four memory dies are all busy, then determining where subsequent units of data are to be sent based on order in which individual dies are expected to become available.

14. The method of claim 11 wherein the four memory dies are NAND flash memory dies.

15. A nonvolatile memory system comprising:
a plurality of nonvolatile memory dies that includes four or more nonvolatile memory dies;
a memory controller;
a memory bus that connects the plurality of nonvolatile memory dies to the memory controller; and
a data assignment circuit in the memory controller that is configured to assign units of data for storage in the plurality of memory dies by selecting the next ready die of the plurality of nonvolatile memory dies according to a cyclic pattern, skipping busy dies, and prohibiting any immediately sequential writes to any individual die.

16. The nonvolatile memory system of claim 15 further comprising additional memory busses that connect additional pluralities of nonvolatile memory dies to the memory controller, each additional plurality of nonvolatile memory dies having data assigned by the data assignment circuit by selecting the next ready die of the additional plurality of nonvolatile memory dies according to the cyclic pattern, skipping busy dies, and prohibiting any immediately sequential writes to any individual die.

17. The nonvolatile memory system of claim 15 wherein the data assignment circuit is further configured so that, if none of the plurality of nonvolatile memory dies is ready, units of data are assigned in order in which nonvolatile memory dies are likely to become ready.

18. The nonvolatile memory system of claim 15 wherein the nonvolatile memory dies are NAND flash memory dies.

19. The nonvolatile memory system of claim 18 wherein the nonvolatile memory dies are three-dimensional NAND flash memory dies with multiple layers of memory cells.

20. The nonvolatile memory system of claim 15 further comprising a host interface that is configured to couple the nonvolatile memory system to different hosts at different times through a set of electrical contacts.

21. The nonvolatile memory system of claim 15 further comprising a prediction circuit that predicts which of the plurality of nonvolatile memory dies is likely to be ready next.

22. The nonvolatile memory system of claim 21 wherein the prediction circuit includes a timing circuit that measures elapsed time since initiation of a write in a memory die and estimates remaining time for the write in the die.

* * * * *